United States Patent [19]

Johnson et al.

[11] Patent Number: 4,758,998
[45] Date of Patent: Jul. 19, 1988

[54] METHODS FOR ATTENUATION OF HORIZONTALLY TRAVELING SEISMIC WAVES

[75] Inventors: Stephen H. Johnson; Carl J. Regone, both of Tulsa, Okla.

[73] Assignee: Amoco Corporation, Chicago, Ill.

[21] Appl. No.: 859,280

[22] Filed: May 2, 1986

[51] Int. Cl.$^4$ ............................................. G01V 1/00
[52] U.S. Cl. ........................................ 367/58; 367/56; 367/63
[58] Field of Search .................... 367/56, 58, 62, 63, 367/38, 43, 47

[56] References Cited

U.S. PATENT DOCUMENTS

| | | | |
|---|---|---|---|
| 2,906,363 | 9/1959 | Clay, Jr. | 367/58 |
| 4,001,770 | 1/1977 | Hofer | 367/56 |
| 4,072,922 | 2/1978 | Taner et al. | 367/63 |
| 4,312,050 | 1/1982 | Lucas | 367/47 |
| 4,403,312 | 9/1983 | Thomason | 367/56 |

Primary Examiner—Thomas H. Tarcza
Assistant Examiner—Ian J. Lobo
Attorney, Agent, or Firm—Scott H. Brown; Fred E. Hook

[57] ABSTRACT

Disclosed is an array of seismic energy receiver elements spaced specifically for attenuation of horizontally traveling seismic waves. In one embodiment, the rows of seismic energy receiver elements are spaced apart a crossline distance d and have a total crossline extent D, and d is less than the velocity divided by the maximum frequency of the noise to be attenuated and D is greater than the velocity divided by the minimum frequency of the noise to be attenuated. In another embodiment, two or more arrays of seismic energy receiver elements are interleaved. Also disclosed herein is a method for processing seismic energy signals to attenuate predetermined wavelengths of seismic waves.

7 Claims, 8 Drawing Sheets

NOTE: hatched areas represent PASS ZONES.

METHODS FOR ATTENUATION OF HORIZONTALLY TRAVELING SEISMIC WAVES

BACKGROUND OF THE INVENTION

1. Field of the Invention

The present invention relates to methods for acquiring seismic energy signals and, more particularly, to such methods which are specialized to attenuate horizontally traveling seismic waves.

2. Setting of the Invention

In the acquisition of seismic energy signals that are used to locate subterranean oil and/or gas deposits, it is known to utilize linear arrays of seismic energy receivers, i.e., long in-line distributions of geophones. While these linear arrays of seismic energy receivers are especially good at attenuating, i.e., reducing or limiting, in-line noise (i.e., horizontally traveling seismic waves that travel parallel or nearly parallel to the linear array), these linear arrays are relatively ineffective at attenuating crossline noise (i.e., horizontally traveling seismic waves which travel nonparallel or oblique to the linear array) and where high velocity material is on the earth's surface or at the near surface. When using linear arrays, the crossline horizontally traveling waves sometimes cause the signal-to-noise ratio of the collected seismic traces to be so poor that the seismic traces are of little use.

Various processing methods and various seismic energy receiver array layouts have been tried to obtain better attenuation of these horizontally traveling seismic waves; however, these methods for practical purposes cannot greatly improve the quality of the resultant seismic energy traces which suffer from crossline noise. This is often the case where the backscattered coherent noise encompasses most of the recording spread, at the reflection times corresponding to the horizons of interest.

Some of the various array layouts tried in the past include a plurality of linear arrays of seismic energy receivers, i.e., a plurality of rows of seismic energy receivers. One such array layout is disclosed in U.S. Pat. No. 4,403,312 to Thomason. In Thomason, arrays of seismic energy sources and seismic energy receivers are used to increase the signal-to-noise ratio by increasing the total number of signals (traces) which are reflected from any one common depth point (CDP), which is well known in the art. Thomason accomplishes this by using a particular source-receiver geometry, where the receivers are on the perimeter of a box layout and the sources are in the interior of the box layout or vice versa. The recorded seismic signal traces are then summed together after assembling specified traces for a number of the specified and different source records. The configuration of the arrays of the seismic energy sources and seismic energy receivers is determined by trial and error to obtain the best signal-to-noise ratio.

Nowhere is it disclosed or suggested within Thomason to space the seismic energy receivers a predetermined distance apart in the crossline direction and to have a predetermined total crossline extent, this spacing specifically chosen to attenuate seismic waves of particular wavelengths. Further, it is not disclosed or suggested within Thomason to further attenuate horizontally traveling seismic waves by combining the seismic traces by sorting and summing (stacking) not during the acquisition of the seismic energy signals, but during the processing of the signals.

Further, high performance arrays have been tried, these arrays are defined as those arrays with substantially greater attenuation capabilities than unit weighted or merely linear arrays. The output of these arrays results in one recorded seismic trace which often fails to achieve the desired result of attenuating horizontally seismic waves because of three factors. First, it is highly unlikely that each element of the arrays, whether it be a single geophone or a single source point, will be identically coupled to the earth and this will result in earth coupling variations from geophone to geophone or from source point to source point, which will modify the effective weights applied to each element of the array and thus degrade the performance of the array. Secondly, environmental features (such as trees, boulders, streams, etc.) often cause the desired element spacing within the array to be physically unachievable. Again, this causes the performance of the array to be degraded. Thirdly, in many areas, the surface noise waves have long wave lengths that are within the desired seismic frequency band; thus the field arrays necessary to attenuate these long wave lengths can become so large that the desired reflection events can be compromised by intragroup statics or differential moveout within the group layout.

There is a need for a method for attenuating horizontally traveling noise waves in a manner that takes advantage of the particular spacing of groups of seismic receivers for the purpose of attenuating seismic waves with a certain wavelength. Further, there is a need for a method which during the process attenuates horizontally traveling seismic waves to a greater extent capable than in prior art methods.

SUMMARY OF THE INVENTION

The present invention provides a novel method and an array layout for overcoming the foregoing disadvantages and meeting the above-described needs. Disclosed herein is an array of seismic energy receiver elements which are spaced at a predetermined distance apart to attenuate predetermined wavelengths of horizontally traveling seismic waves. In one embodiment, a plurality of rows of seismic energy receiver elements are provided wherein each is spaced apart a crossline distance d and have a total crossline extent D. In this embodiment, d is less than the velocity divided by the maximum frequency of the seismic wave to be attenuated, and D is greater than the velocity divided by the minimum frequency of the seismic waves to be attenuated.

The present invention further provides a field acquisition technique used for a special class of field problems caused by high velocity surface waves and offline secondary sources. In areas where these problems exist, the common midpoint (CMP) method, as is well known in the art, with inline source and receiver arrays, usually yields poor results. Two concepts responsible for the new technique of the present invention are as follows. The first is that greater attenuation and better control over the reject band are possible with high performance synthesized arrays than with their field implemented counterparts. The second concept is that of the usable bandwidth of an array; i.e., in hard rock areas with high velocity surface waves, only a rather narrow band of wavelengths can exist for which the undesired noise events, but not the desired signal events, can be attenuated by an array. This band of wavelengths constitutes the usable bandwidth of the array. As described later, a broadband acquisition effort can be possible in these areas by interleaving a series of bandlimited arrays.

Interleaved arrays are herein defined to be a series of bandlimited areal arrays, each of which rejects a different band of wavelengths. Each array in the series is centered over the same ground location, but each array has a different physical size than the other arrays in the series. Every element in each array in this series of interleaved arrays comprises the recorded output of a subarray of one or more unit weighted geophones. A field arrangement will be described below whereby the same recorded subarray of one or more geophones can be used in the synthesizing of more than one areal array in the interleaved series. This feature of the technique inspires the term "interleaving" and further allows a more simplified field layout than would be possible otherwise. This technique approximates a discrete velocity filter, giving high attenuation with far fewer elements than a full velocity filter would require.

In the present invention the seismic energy receiver elements are wired for individual recording, i.e., each seismic energy receiver element, which can be comprised of one or more geophones, is individually recorded and removed to a single trace.

Further, a processing method is provided wherein the method comprises balancing or scaling the amplitude of a plurality of seismic energy signals resulting from elements in a row of seismic receiver elements which are spaced a predetermined distance apart in the crossline direction and having a total crossline extent which is chosen for attenuation of predetermined wavelengths of seismic noise. After the amplitudes have been balanced, then the seismic energy signals are weighted and summed in the crossline direction and then the processed seismic energy signals are outputted. It should be emphasized in the method that inline processing techniques after or before the summing of the seismic energy signals in the crossline direction can be accomplished as has been as well known in the art.

The present method and arrangement of receivers overcomes the previously mentioned problems for the following reasons. The variation in element spacing is reduced because each element of the array disclosed within the present invention is the recorded output of the multiplicity of the sources or receivers arranged in some distribution or pattern about a carefully surveyed group location. Also, because each element in the array is now a recorded seismic trace, it is possible to adjust (during processing) for any variations in earth coupling by scaling operations, as is well known in the art, during the data processing. Therefore, desired element weights will be definitely achieved. Lastly, the errors in the proper location of any one geophone, or any one source point, will be statistically averaged over the relatively large number of geophones, or source points, that comprise each recorded signal trace, in that the centroid of the array of geophones, or source points, will be very close to the surveyed position of the group or the source point. Therefore, the element spacing in the array of the present invention will be much more accurate than in the field implemented version.

Finally, because the synthesized array is formed from recorded seismic traces, it is possible to make appropriate corrections to the data to avoid the problem of intragroup statics or excessive differential moveout within the group.

DETAILED DESCRIPTION OF THE PREFERRED EMBODIMENTS

Figure 1:
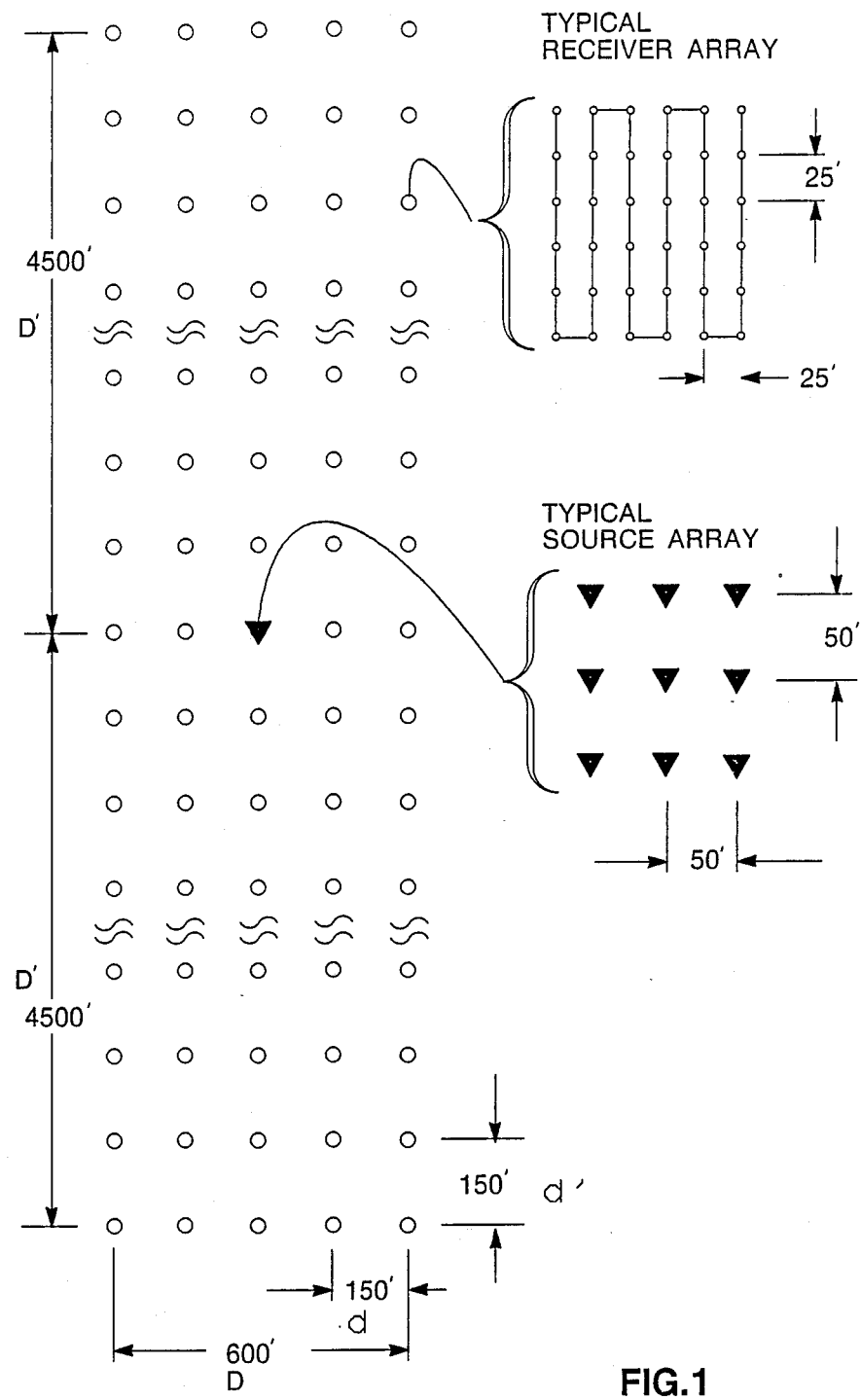
FIG. 1 is a semi-diagramatic, plan view of a layout of seismic energy sources and seismic energy receiver elements, as in accordance with one embodiment of the present invention.

Disclosed herein is an array of seismic energy receiver elements which are spaced at a predetermined distance apart to attenuate predetermined wavelengths of horizontally traveling seismic waves. The arrays comprise a plurality of rows of seismic energy receiver elements each spaced apart a crossline distance d and having a total crossline extent D, wherein d is less than the velocity divided by the maximum frequency of the seismic waves to be attenuated, and D is greater than the velocity divided by the minimum frequency of the seismic waves to be attenuated. Further, the present invention includes a processing method for processing seismic energy signals to attenuate seismic waves. The initial process is to equalize the amplitude of a plurality of seismic energy signals resulting from field recording. After the amplitudes of the seismic energy signals have been balanced, then the seismic energy signals from the seismic receiver elements aligned in the crossline direction are weighted and summed. Thereafter, further inline processing techniques can be arranged to process seismic energy signals which are then outputted for analysis. An alternate embodiment of the present invention utilizes interleaved arrays of nonequally crossline spaced receiver arrays.

By way of explanation, areal arrays are needed when offline seismic waves create a cone of high amplitude, source generated coherent noise that encompasses all or most of the recording bandwidth spread at the reflection times corresponding to the earthen subterranean horizons of interest. This occurs most often in hard surface areas, where Rayleigh waves have high velocities and little attenuation or dispersion. In these areas, the noise wavelengths are longer than usually encountered for normal seismic frequencies and large areal arrays are necessary. The usual method of implementing these large arrays is to combine unit weighted areal receiver arrays with unit weighted areal source patterns, where the effective array length of one of the arrays is about 66% of the effective array length of the other array. In this way, about 30 db of attenuation can be achieved in the reject band. Several problems are encountered with this approach. First of all, the number of shots in each source pattern is usually quite large. If a vibration source such as Vibroseis is used, this method is restricted to desert or similarly open areas. Secondly, the number of geophones needed in each receiver array can be quite large. When such large areal arrays are formed, it is not uncommon to have more than 100 geophones in each group that are electrically connected in the field. In wooded areas, many trails will have to be cut in both the inline and crossline direction. Thirdly, the array size is fixed and must be large so that low frequency coherent noise can be attenuated. This large array size can cause a loss of high frequency signal, or can exaggerate intragroup statics problems. Fourthly, the practical attenuation level is limited to 30 db or less with this approach. If the coherent noise is more than 30 db above the desired signal, then the array can yield only poor data. Lastly, physical conditions in the field, or economic restrictions, can prevent the use of an areal source array. In this case, the crossline attenuation level achieved by the areal receiver array alone drops to around 13 to 15 db for the crucial longer noise wavelengths, and it is very easy for the desired signals to be overwhelmed by any coherent noise coming from an off line direction.

The interleaved areal arrays described later herein can be implemented in the field in a way that appears similar to some wide line profile methods. In wide line profiling, the primary concern is to obtain crossline dip information with regard to subsurface horizons. Selection of line spacing as well as the number of CMP lines is determined by subsurface velocities and anticipated dips. The major criterion for the line spacing in wide line profiling is that the array formed by the number of CMP lines, and the crossline CMP interval, should be long enough to determine the crossline dip of the subsurface beds. Because of the high velocities usually present at depths of interest, the wavelengths associated with reflections from these beds are long; and the required subsurface array must also be long. The desired number of CMP lines can be achieved in many ways with a wide line profile, and in practice is often achieved by a combination of multiple source and receiver lines. The recorded data are usually processed with 3-D programs, and the multiple CMP lines are not combined into one 2-D line until after each has been processed through a CMP stack. The crossline stack of wide line profile data is usually done along the perceived direction of subsurface crossline dip.

In designing a field procedure for interleaved areal arrays of the present invention, the primary concern is that the recorded seismic traces can be arranged in processing to form the proper geometry of the required areal arrays. This geometry is dependent on characteristics of the near subterranean surface rather than of the subsurface. The resulting line spacing is therefore quite different than in wide line profiling. The line spacing in the interleaved areal arrays is not uniform, whereas in wide line profiling the CMP lines are almost always uniformly spaced. Further, almost without exception, the line spacing of a wide line profile is too great for forming even one high performance areal array, let alone a series of them. Because a part of the design criteria for an interleaved array is that desired signal events should not be attenuated by the interleaved arrays, the collapsing of the data into one 2-D line can be done without regard to subsurface crossline dip.

During the implementation of the present invention, the particular area to be surveyed is reviewed in that, if needed, a wave test, which is well known in the art, is utilized to determine the coherent seismic wave velocity, such as noise waves, i.e., those signals which are desired to be excluded from the seismic energy signals. Noise is defined here as all signals other than primary reflection data. After the wave tests have been completed for the determination of coherent noise wave velocities, then the seismic bandwidth, i.e., the maximum and minimum frequencies are selected to obtain the shortest wavelength and the longest wavelength of the horizontally traveling or the crossline noise, that are to be attenuated.

Once the noise wave velocities have been determined and the maximum and minimum frequencies in wave lengths have been determined, then the array of seismic energy receiver elements can be designed. FIG. 1 discloses one such design array wherein each circle defines a seismic energy receiver element and each triangle defines a source element or array. The sources utilized herein in the present invention can be vibroseis, dynamite, or any other known seismic energy source method or device. Each circle represents the seismic energy receiver elements, which can be a single geophone or a plurality of geophones all wired or connected together to form a single trace signal. As shown in FIG. 1, the receiver array is in the form of a square or any other array shape, such as a 36 geophone grouping, again all wired to form a single signal. The layout of the single receiver or array of receivers, the array being either a square, a circle, or a linear array, is located as well as possible over a central surveyed and predetermined position.

The separation between the center of each seismic energy receiver element in the crossline direction is a certain distance d, and a total crossline distance D across n receiver elements is a distance $D=(n-1)d$. For example, in FIG. 1, $d=150$ feet, $n=5$, and $D=(n-1)d=600$ feet.

The sources or source arrays can be positioned to one side within or both sides or a plurality of source arrays across or within the two-dimensional array of seismic energy receiver elements, as will be described hereinafter. Also, the two-dimensional array formed by rows of seismic energy receiver elements has an inline distance apart of d' and a total inline extent of D'. For the purposes of the present invention, it has been found that d' and d should be approximately equal. The maximum in-line extent for this method, D', is determined by the same criteria as the maximum in-line extent is in the well known prior art of the CDP method.

One of the major features of the present invention is the spacing of the seismic energy receiver elements in the crossline direction. The crossline receiver element spacing is determined by being given a known noise velocity measured during the wave test on the line, and knowing the desired frequency bandwidth of the seismic energy noise waves to be attenuated, i.e., the frequency minimum and the frequency maximum desired to be attenuated, then using seismic equations it has been found that the crossline spacing between the individual seismic receiver element d needs to be less than the minimum wavelength which is equivalent to the velocity of the noise divided by the the maximum frequency to be attenuated and that the total crossline extent D be greater than the maximum wavelength of the noise to be attenuated, which is equal to the velocity of the noise divided by the minimum frequency of the noise to be attenuated. Utilizing these two relations in the crossline direction, then a two-dimensional array can be formed in processing that will attenuate the horizontally traveling crossline noise waves within the predetermined frequency band width.

The inventors hereof know of no other method or arrangement of seismic energy receiver elements which are specifically designed or specifically spaced for attenuating crossline or horizontally traveling noise waves in the above-described manner.

Further, it should be understood that the inline spacing d' and D' can be made in accordance with the present invention by spacing d' and D' wherein d' is less than the minimum wavelength of the noise to be attenuated and D' is greater than the wavelength of the maximum wave-length of the noise to be attenuated, as described above.

Utilizing the method of the present invention, once the seismic energy signals have obtained from a two-dimensional array of seismic receiver elements, and preferably, from a two-dimensional array of seismic receiver elements set forth as described above within the present invention, then the recorded data can be frequency filtered to the desired bandwidth to eliminate unattenuated noise and band-limit the data. The seismic energy signals then can be first balanced, or scaled, by multiplying each trace by a trace constant or a time-variant scalar calculated from the values of the trace samples, as is well known in the art, to assure that the trace-to-trace amplitudes within a given time window are approximately equal.

Then each seismic energy trace can be multiplied by a weighting factor to give a greater attenuation capability than utilizing unit weighting or linear arrays, as is well known in the art.

Thereafter, each seismic trace from the seismic receiver elements in the crossline direction are summed. This summing is a process whereby a sample at a particular time from one trace is multiplied by a scalar or a weight, and then is added to similarly scaled samples from other traces. Thereafter, the traces are divided by the total number of weights added together. These scalar numbers or weights can be identical (unit weight) or unequal in some fashion corresponding to various computational methods, such as Chebychev weights. The amplitudes of the mixed traces can be equalized or scaled as before.

It should be understood also that prior to the summing step, appropriate corrections for elevational differences and surface statics can be made, as is well-known. Also, different time shifting, which is a well-known technique, can be made so that the weighted crossline sums is moved along a differential time line to highlight subsurface events, such as dipping planes.

After the crossline traces have been combined into one trace that is free from crossline noise, then the resulting inline traces can be processed utilizing any known processing technique, for example, midpoint stacking, velocity filtering, partial migration before stack, plane wave domain methods, residual statics, normal moveout correction and the like. Also, the resulting inline traces can be processed tracing the summing process, as utilized above in the present invention, as for the crossline direction.

It should be understood that the individual seismic receiver element traces can be weighted and summed crossline at any time during the process; for example, in contrast to the described method above, the individual seismic receiver element traces can be processed as individual, two-dimensional linear arrays and then the lines summed in the crossline direction.

The increased attenuation in the seismic noise waves afforded by the present invention is thought partly in fact to be due to the trace balancing, or scaling, before mixing and the choice of weights utilized during the mixing. The amount of noise wave attenuation can be adjusted by varying the weights within certain limits of the number and spacing of the arrays, as well as the band width desired. The usage of Chebychev weighting, in particular, results in greatly increased attenuation compared to that obtained by single, large, areal arrays. It is known that for a single array of equally sensitive, equally spaced seismic receiver elements, the maximum attenuation possible at any one wavelength is a function of the number of seismic receiver elements utilized. Theoretically, the response of an array of seismic energy receiver elements can be greatly improved by unequal detector gain or unequal detector spacing according to several methods of calculating array responses, i.e., Chebychev and Savit. Experience with the array elements weighted in the field prior to recording the signal indicates that the actual results often fail to equal the expected theoretical attenuation improvement. The disclosed present method minimizes these field problems again in that the coupling in the geophone array is the average of the individual geophone couplings utilized, and this average is not very great from one array to the next. Even if variations do result, the trace balancing, or scaling, prior to mixing minimizes these trace-to-trace variations. Secondly, the spacing between the seismic energy receiver elements is on the order of tens of feet, not just a few feet, as in methods previously utilized. Thus, any errors in the receiver spacing is a very small percentage of the total.

An alternate embodiment of the array layout of the present invention will be described. This array layout is entitled "interleaved arrays." An important feature of this array layout or arrangement is that it uses Chebychev arrays. Chebychev arrays are characterized by constant ripple height in the reject zone; the arrays produce a sharp cutoff, and for a given width of the reject zone, the arrays have the greatest minimum level of attenuation of any array known. In addition, the width of the reject zone and the level of attenuation are easily controlled by changing the element weights which gives great design flexibility.

The use of Chebychev weights is not crucial to the success of the interleaved arrays method, but rather provides a convenient and effective means of achieving the desired array response. A more detailed description will be provided below.

If $L_{max}$ and $L_{min}$ are defined as the longest and shortest wavelengths to be rejected at an attenuation level, A, by a Chebychev array composed of n elements spaced a distance, D, apart, then the rejection zone bandwidth is given by the ratio:

$$\frac{Lmax}{Lmin} = \frac{Lmax}{D} - 1 = \beta - 1, \quad (1)$$

where $\beta \equiv \frac{Lmax}{D}$.

The attenuation level, A, is given by the expression $$A = 20\log[\cosh[(n-1)\cosh^{-1}[1/\cos(\pi/\beta)]]]. \quad (2)$$

Thus, we can solve Equation (2) for n to get the number of elements needed to achieve an attenuation level, A, for a particular rejection bandwidth defined by $\beta$.

$$n \simeq 1 + \frac{\ln[2 \times 10^{(A/20)}]}{\cosh^{-1}[1/\cos(\pi/\beta)]} \quad (3)$$

Figure 2:
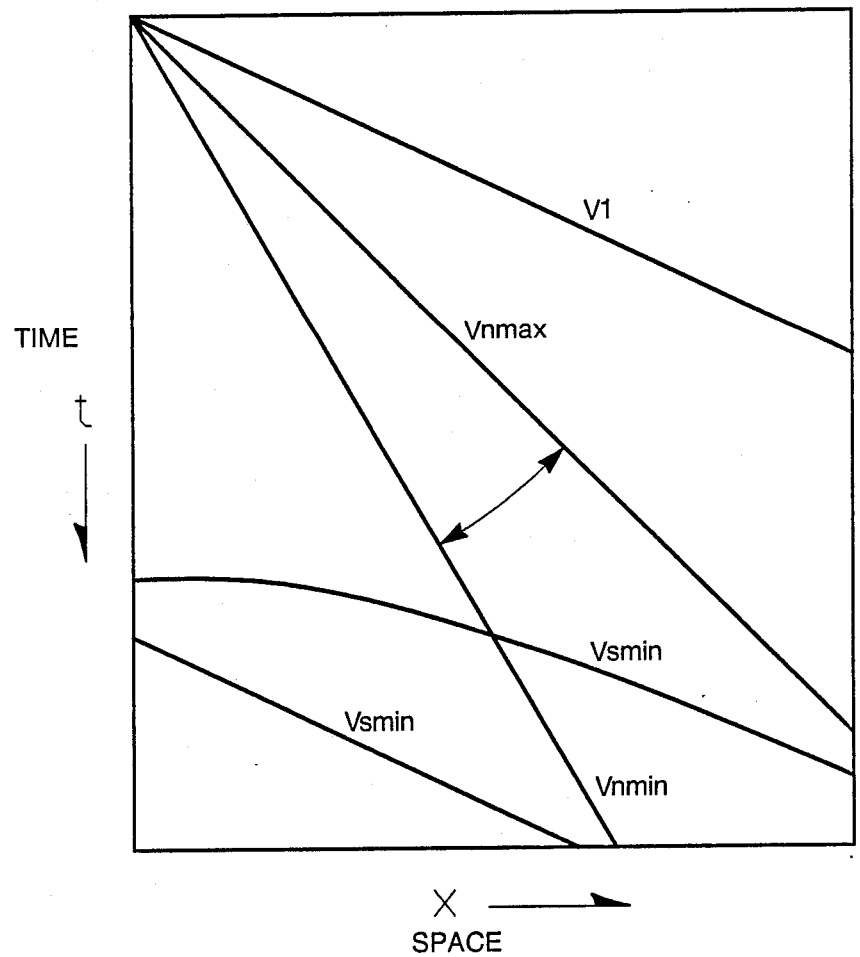
FIG. 2 is a graphical representation of the Space-Time Domain relationship of Signal and Noise apparent velocities.
Figure 3:
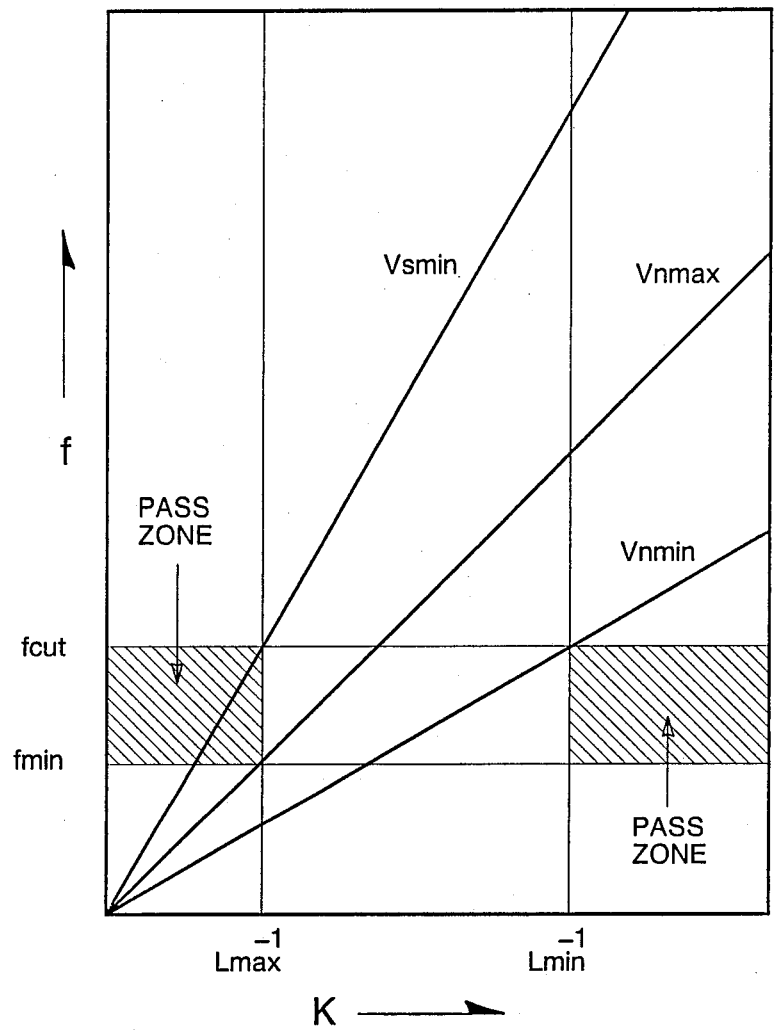
FIG. 3 is a graphical representation of the Frequency-Wave number Domain relationship of Signal and Noise apparent velocities.

Referring to FIGS. 2 and 3, let:
Vnmax = the highest apparent velocity for undesired noise events
Vnmin = the lowest apparent velocity for undesired noise events
Vsmin = the lowest apparent velocity for desired signal events
fmin = the lowest desired frequency
fcut = the highest frequency obtained without loss of signal Then, the following relationships hold:

$$\frac{Vnmax}{fmin} = Lmax, \frac{Vsmin}{Lmax} = fcut, \text{ and } \frac{Vnmin}{fcut} = Lmin \quad (4)$$

The usable frequency bandwidth comprises that portion of the frequency spectrum where the coherent noise, but not the desired signal, is attenuated. This bandwidth is given by the ratio $$\frac{fcut}{fmin} = \frac{Vsmin}{Vnmax}. \quad (5)$$

The required bandwidth of the rejection zone, Lmax/Lmin, can be written as $$\frac{Lmax}{Lmin} = \frac{Vnmax}{Vmin} \frac{fcut}{fmin} = \frac{Vsmin}{Vnmin}. \quad (6)$$

Combining equations (1) and (6) yields $$\beta = \frac{Vsmin}{Vnmin} + 1. \quad (7)$$

Substituting this expression for $\beta$ and the desired level of attenuation, A, into Equation (3) gives the minimum number of elements, n, required for use in the interleaved array. These n elements must be spaced a distance $D = Lmax/\beta$ apart.

EXAMPLE 1

(Surface Limestone Area)

For the first example of this method, consider the situation that has been encountered in several areas where limestone is on the surface. The Rayleigh waves observed in these areas have had very little attenuation or dispersion, and have exhibited one dominant velocity approximately equal to half the interval velocity of the surface beds. Thus, for this example we have $$\frac{Vsmin}{Vnmax} = 2, \text{ and } \frac{Vnmax}{Vnmin} = 1.$$

From Equation (5), the usable frequency bandwidth is one octave. From equation (6) the required reject zone bandwidth is also one octave. From equation (7) the required element spacing is Lmax/3. If we want an attenuation level of 40 db, we find from equation (3) that we need to have 5 elements in the array. If we want greater attenuation than 40 db, we would need more than 5 elements in the array. For example, if we want 60 db attenuation with a one octave reject zone, we would need 7 elements.

Figure 4A:
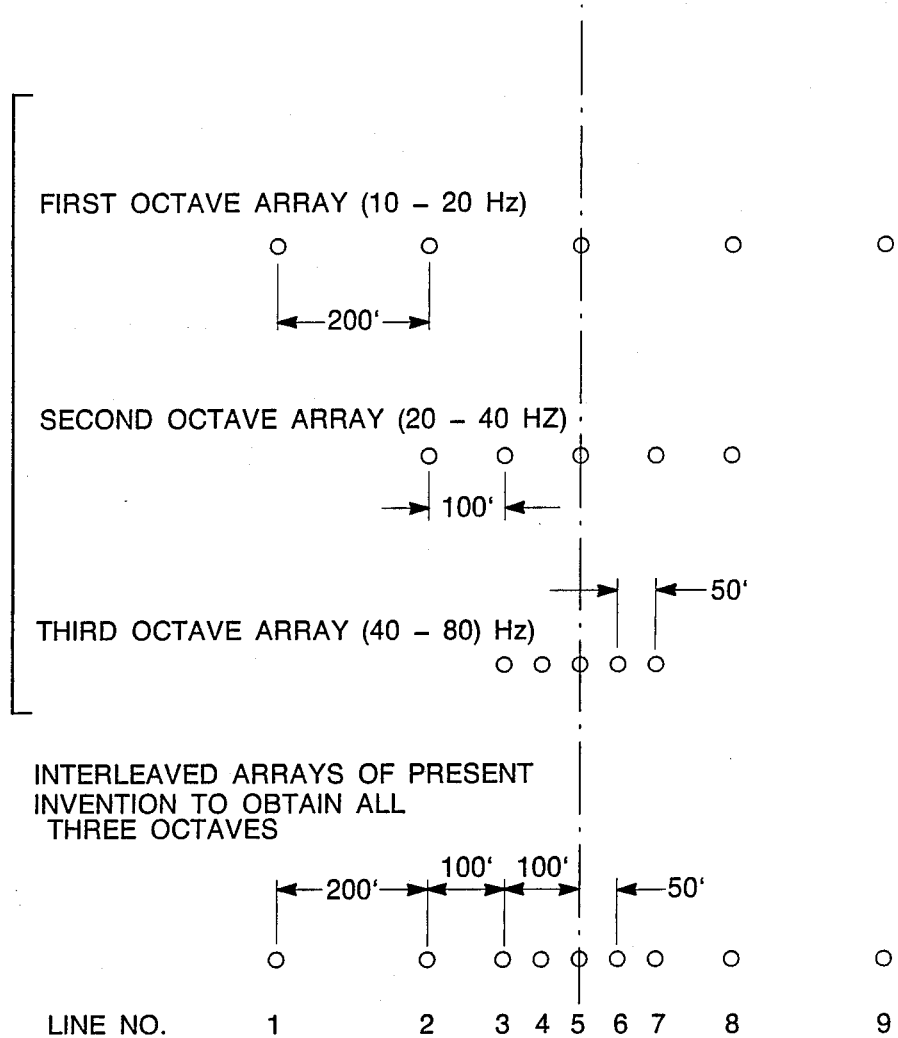
FIG. 4a is a semi-diagramatic, plan view of a layout of seismic energy receiver elements, as in accordance with one embodiment of the present invention, of Example 1.
Figure 4B:
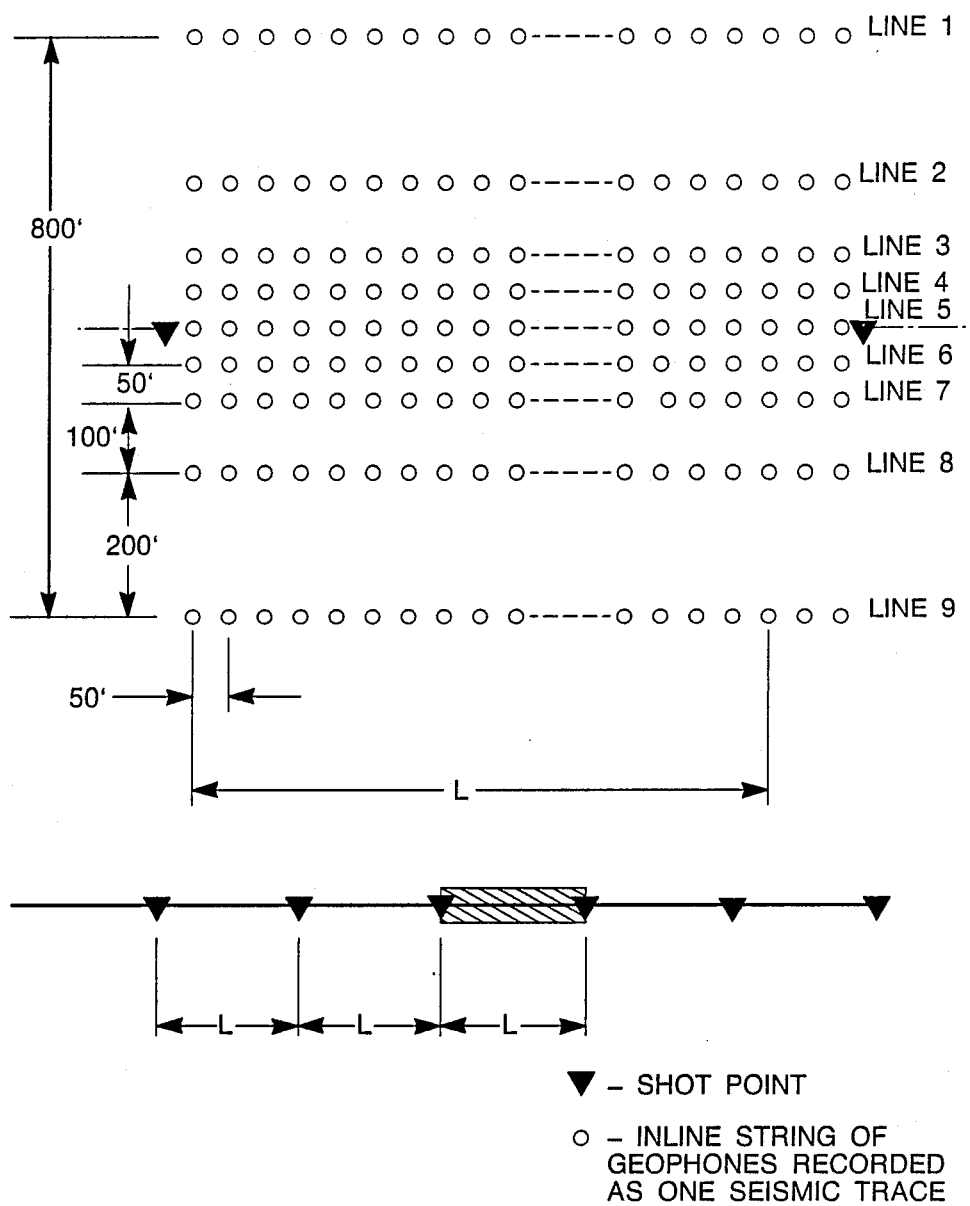
FIG. 4b is a semi-diagramatic, plan view of a layout of seismic energy sources and seismic energy receiver elements, as in accordance with one embodiment of the present invention, of Example 1.
Figure 4C:
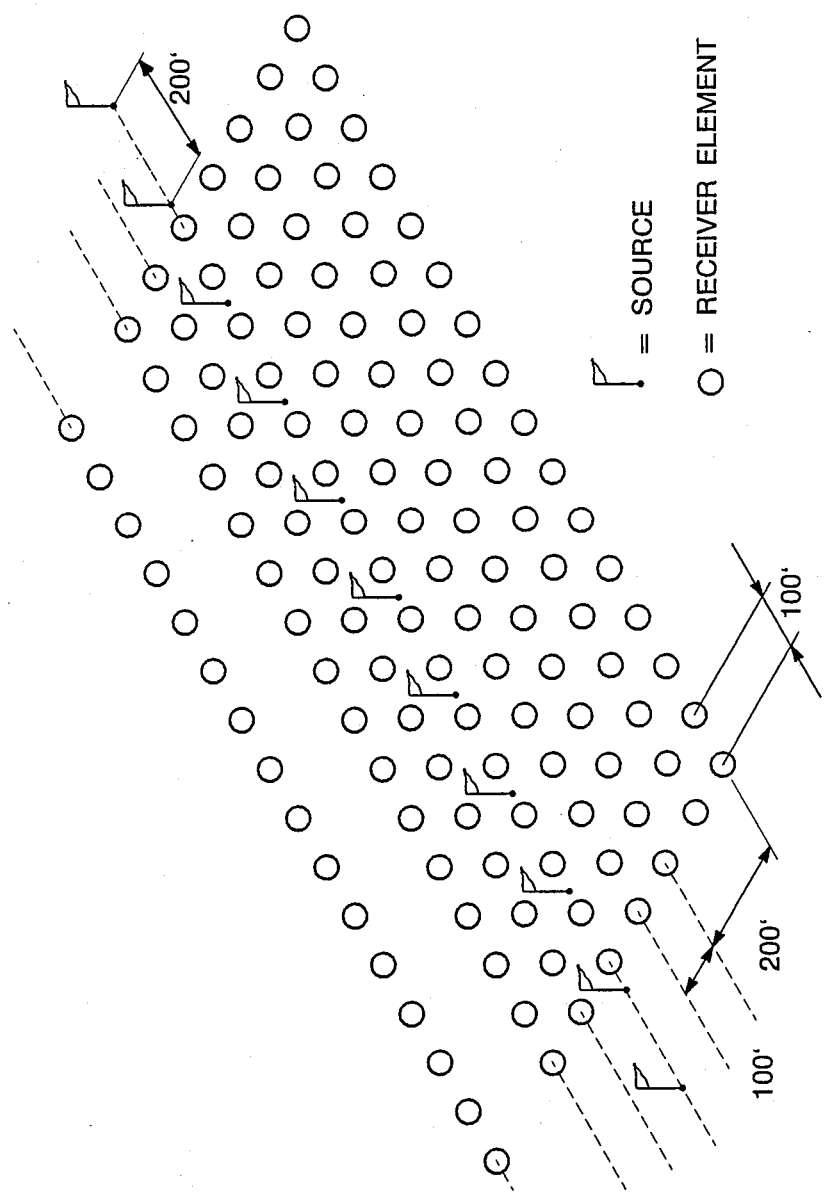
FIG. 4c is a semi-diagramatic, perspective view of a layout of seismic energy sources and seismic energy receiver elements, as in accordance with one embodiment of the present invention, of a two octave version of Example 1.
Figure 5:
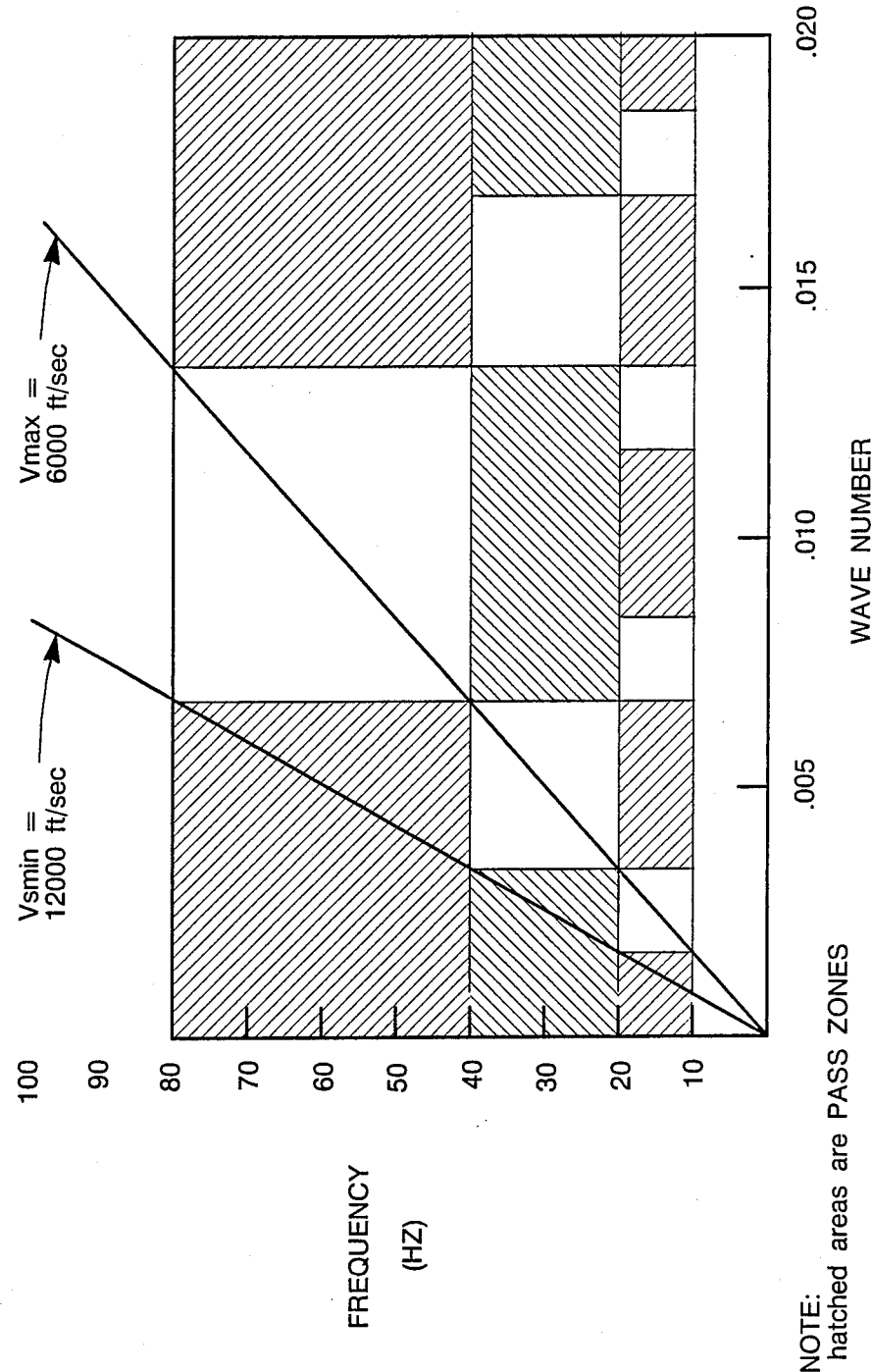
FIG. 5 is a graphical representation of the relationship of Vsmin and Vnmax on frequency vs. wavenumber of Example 1.

Suppose, for discussion sake, that
Vnmax = 6000 ft/sec
Vnmin = 6000 ft/sec
Vsmin = 12000 ft/sec
fmin = 10 Hz
A = 40 db
Then,
Lmax = 600 ft
Lmin = 300 ft
D = 200 ft
fmax = 20 Hz
n = 5.
If we form another array with fmin = 20 Hz, we get the next octave
Lmax = 300 ft
Lmin = 150 ft
D = 100 ft
fmax = 40 Hz
n = 5.
These arrays can be interleaved in the field by locating seven geophone lines in the manner shown in FIGS. 4a, 4b, 4c and FIG. 5.
As for FIG. 4a, let
Vnmax = Vnmin = 6000 ft/sec
Vsmin = 12000 ft/sec
n = 5
D = Lmax/3
fmin = 10 Hz, 20 Hz, and 40 Hz Each seismic line in FIG. 4a is a conventional 2-D seismic line with inline arrays of geophones. The inline group interval is preferably equal to the minimum line spacing. There is only one shot line and it is coincident with the center geophone line. In order to obtain the:

|  | 1st octave | 2nd octave | 3rd octave, |
| --- | --- | --- | --- |
| one combines lines: | 1, 2, 5, 8, 9 | 2, 3, 5, 7, 8 | 3, 4, 5, 6, 7 |
| and filters to band: | 10–20 Hz | 20–40 Hz | 40–80 Hz. |

Thereafter, one can apply the same procedure inline and sum the filtered results to obtain a 2-D line, or one may sum the filtered results and then velocity filter in the inline direction. Each 5 element cross line array is formed separately of any other array and frequency filtered to its appropriate band. By adding two more geophone lines, a third array can be added to get the third octave beginning at 40 Hz.
Lmax = 150 ft
Lmin = 75 ft
D = 50 ft
fmax = 80 Hz
n = 5.
In the inline direction, a group interval equal to the smallest crossline line spacing is preferably used, and the arrays formed as a series of running mixes. It is important that the appropriate Lmax and frequency filters be used for each inline array, and that care is taken before the arrays are summed to be sure that all arrays to be summed are centered about the same ground location. An alternate treatment for the noise inline would be to velocity filter the data.

EXAMPLE 2

(More than one noise velocity)

For a second example, let us assume (as in the first example) that Vsmin/Vnmax=2, but that instead of one noise velocity, we have a range of noise velocities given by Vnmax/Vnmin=2.

Figure 6:
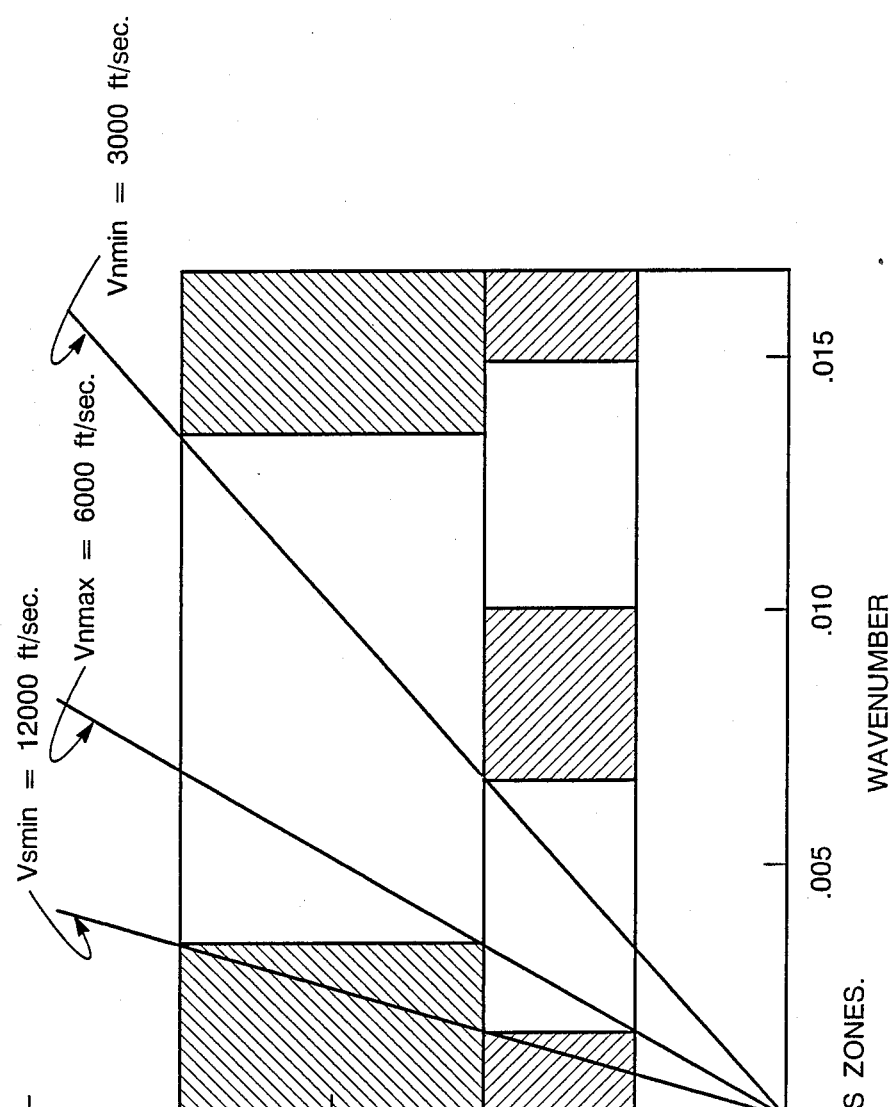
FIG. 6 is a graphical representation of the relationship of Vsmin, Vnmax, and Vnmin on Frequency vs. Wave number of Example 2.

Then, as shown in FIG. 6, from Equation (6) we get $$\frac{Lmax}{Lmin} = 4$$

This means that although the frequency bandwidth is still only one octave wide, the array's reject zone must be two octaves wide. To achieve 40 db attenuation with a two octave reject zone requires 9 elements instead of the 5 needed before. To interleave two of these arrays to get two octaves of usable frequency band, as in the manner of Example one, would require 13 geophones lines. The processing sequence would be the same in both cases.

A way to tell whether the array reject bandwidth must be larger than the usable frequency bandwidth is to measure the noise waves in the field. It should be remembered that noise waves that travel slowly enough so that an appreciable portion of the usable recording spread length lies outside the noise cone do not present a significant problem to the CMP method and so do not need to be considered when designing an interleaved array method.

EXAMPLE 3

Let us consider the case where the noise velocity is a little slower with respect to the minimum signal apparent velocity than in the first example, but where there is again only one dominant noise velocity. Let, $$\frac{Vsmin}{Vnmax} = 4, \text{ and } \frac{Vnmax}{Vnmin} = 1.$$

The usable frequency bandwidth and the required reject zone bandwidth are then both two octaves. In this case, only one array need be formed to achieve an acceptable wavelet. To reach an attenuation level of 40 db with a two octave reject zone it will be necessary to have 9 elements (geophone lines) in the array. However, if the one octave wide interleaved arrays of Example 1 are used, the two octaves can be achieved with only 7 geophone lines.

In summary, the interleaved array layout can be designed as follows:

(a) determine the minimum and maximum noise velocity to be attenuated, (b) determine the minimum apparent velocity of the signal, (c) determine the required reject bandwidth of an array, (d) determine the attenuation level of the array, (e) from (c) and (d), determine the number of elements needed for the array, and (f) determine element spacing.

If, fcut/fmin<4, then the bandwidth of the array may not be sufficient to obtain a good seismic wavelet, and thus more than one array is needed.

(g) determine a second fmin for the second array and use the steps above to determine the number of elements needed and the element spacing for the second array.

(h) interleave the two array layouts, to obtain interleaved array plan to be used in the field.

For the in-line spacing (d') of the seismic receiver elements, one can use the shortest crossline spacing as the inline spacing.

As for processing the interleaved array, it is preferable to use the previously described processing technique of the present invention. For example, if there is sufficient inline spacing attenuation of the noise, one will filter the first array to fmin/fcut and then filter the second array to its fmin/fcut, then sum the two arrays together. Thereafter, the resulting traces are processed by scaling, weighting, stacking, filtering, and summing (as described earlier).

If one cannot obtain sufficient attenuation using source arrays and inline receiver arrays, then the interleaved array method is used where the one or more arrays are split and scaled, weighted, stacked, mixed inline (each data set with the same array spacing as used crossline), filtered, and the summed (as described earlier).

It is believed that the method and apparatus of the present invention has a wide variety of applications and can be particularly useful where scattered noise from a crossline direction affects the data. Situations where the present invention can be utilized include the following: where high velocity limestone is on the surface, e.g., in Florida and on the Edwards Limestone in Texas; volcanic areas where the high velocity inhomogeneous layer forms the surface layer; wherever severe topography contributes to scattering; wherever shear waves are acquired (Rayleigh waves traveling in a crossline direction and recorded as if they were shear waves); whenever the target depth is so deep that reflections are affected by horizontally traveling seismic noise even if the noise velocity is not high; and further in other areas where a hard rough subsurface creates scattered waves traveling in the crossline direction.

Wherein the present invention has been described in particular relation to the drawings and examples included herein, it should be understood that other and further modifications apart from those shown or suggested herein, may be made within the scope or spirit of the present invention.

We claim:

1. A method of processing seismic energy signals to attenuate a predetermined wavelength of horizontally traveling noise, the seismic energy signals being obtained from an interleaved array formed by a plurality of rows of individually recorded seismic energy receiver elements each spaced apart in at least two symmetric groupings and sharing at least one common row of seismic energy receiver elements, wherein the crossline spacing for the first symmetric group is $d_1$ and the crossline spacing for the second symmetric group is $d_2$ and the total crossline extent for the rows is D, wherein $d_1$ and $d_2$ are less than the velocity of the seismic waves to be attenuated divided by the minimum frequencies of the seismic waves to be attenuated for the at least two symmetric groupings, and wherein D is greater than the velocities of the seismic waves to be attenuated divided by the minimum frequencies of the seismic waves to be attenuated for the at least two symmetric groupings, the method comprising:

(a) filtering the signals from the first and second symmetric grouping;
(b) summing the seismic signals of the two symmetric groupings together;
(c) scaling the amplitude of the seismic signals;
(d) summing the signals from the seismic receiver elements aligned in a crossline direction; and
(e) outputting the seismic energy signals.

2. The method of claim 1 wherein the seismic energy signals from the seismic receiver elements aligned in a crossline direction are weighted before summing in step (d).

3. The method of claim 1 wherein step (c) comprises multiplying each seismic energy signal by trace constant.

4. The method of claim 1 wherein step (c) comprises multiplying each seismic energy signal by a time-variant scalar.

5. The method of claim 1 wherein the seismic energy signals from the seismic receiver elements of each symmetric grouping aligned in the in-line direction are summed.

6. The method of claim 5 wherein the steps of summing comprise multiplying samples from the seismic energy signals by a scalar, summing all of the samples, and then dividing the samples by the total number of summed samples.

7. The method of claim 1 wherein step (e) comprises outputting the seismic energy signals as a seismic energy signal trace.

* * * * *